United States Patent Office 2,767,223
Patented Oct. 16, 1956

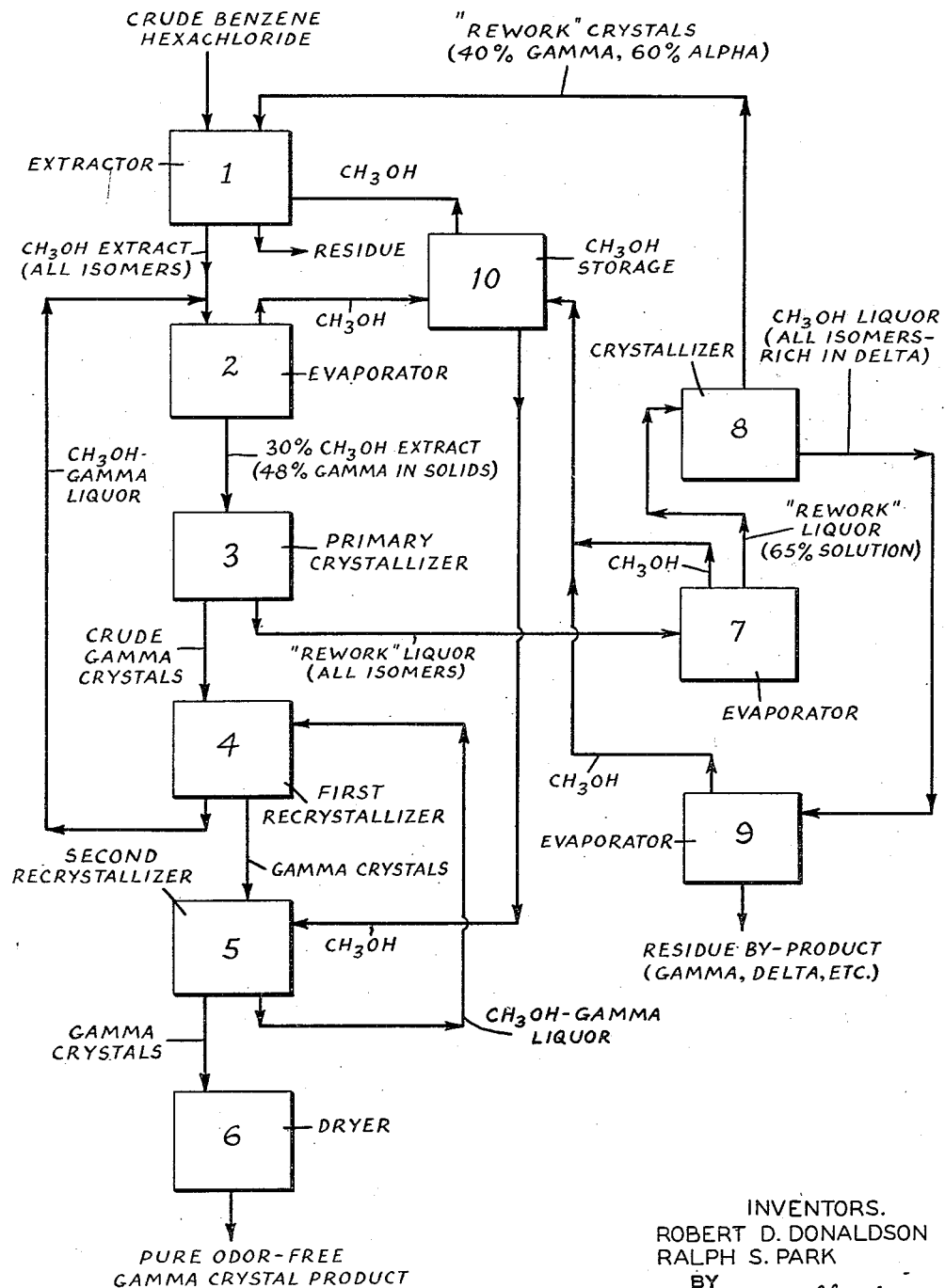

2,767,223

PRODUCTION OF BENZENE HEXACHLORIDE GAMMA ISOMER COMPOSITIONS

Robert D. Donaldson, Wilmington, Del., and Ralph S. Park, Swarthmore, Pa., assignors to Allied Chemical & Dye Corporation, New York, N. Y., a corporation of New York Application October 23, 1951, Serial No. 252,674

3 Claims. (Cl. 260—648)

This invention relates to an improved process for the isolation of the gamma isomer of benzene hexachloride from crude benzene hexachloride containing a mixture of its isomers, and is more particularly concerned with improved procedure for obtaining benzene hexachloride in the form of its practically pure gamma isomer.

Benzene hexachloride (1,2,3,4,5,6-hexachlorocyclohexane) is a known compound which may be obtained by reacting chlorine with benzene under conditions favorable for permitting the addition of chlorine rather than the substitution of chlorine for hydrogen. For example, chlorine may be passed into benzene at ordinary or elevated temperatures, e. g. 50 to 60° C., while subjecting the reaction mixture to actinic radiation. The crude benzene hexachloride may be recovered by contacting the chlorination product with hot water, for example, at about 75° C., to flash off unconverted benzene, and the precipitated product filtered off and dried to produce a crude benzene hexachloride material.

Such crude benzene hexachloride has been considered as composed essentially of a mixture of stereoisomers consisting of the alpha, beta, gamma and delta forms, in which the alpha isomer predominates. Small amounts of chlorination by-products such as chlorine-substituted benzene hexachloride may also be present in the mixture of isomers. Hence, the term "crude benzene hexachloride" employed throughout the specification and claims is intended to denote mixtures of the alpha, beta, gamma and delta isomers of benzene hexachloride, and which may also contain chlorinated benzene impurities.

While the mixed benzene hexachloride product of the above chlorination reaction has insecticidal properties, it has been found that most of this insecticidal value resides in the gamma isomer, a white crystalline practically odorless material exhibiting a melting point of about 112° C. The other isomers have comparatively little, if any, effectiveness as an insecticide, and some of them are harmful to humans and stock. Moreover, it has been considered that probably the small proportion of the various chlorine substituted benzene by-products present are responsible for the disagreeable odor of the crude benzene hexachloride. Hence, recent prior art has been concerned with the isolation of the gamma isomer from the crude benzene hexachloride mixture containing the above-noted isomers and by-products in order to obtain benzene hexachloride in a form of maximum value as an insecticide.

It has been proposed to extract crude benzene hexachloride with various selective organic solvents to produce a benzene hexachloride extract solution having a mixture of isomers which is richer in gamma than the crude benzene hexachloride starting material, evaporating off solvent, and cooling the resulting hot concentrated solution to fractionally crystallize out gamma isomer. Solvents previously disclosed for this purpose include benzene, toluene, xylene, n-pentane, carbon tetrachloride, chloroform and methanol. It has been recognized that under certain conditions of slow cooling in a quiescent state, the gamma isomer may be selectively precipitated from such concentrated extract solutions saturated with alpha, beta, and gamma isomers without causing the precipitation of the alpha and beta isomers in spite of their lower solubility.

However, one of the chief obstacles encountered by the prior art for obtaining the gamma isomer of benzene hexachloride reasonably free from other isomers, particularly alpha, by differential crystallization from the above solvent extract solutions has been the uneconomical prolonged cooling and crystallization periods generally heretofore required, for example, 12 to 48 hours of cooling while carefully maintaining the solution quiescent as disclosed in British Patents 573,693 and 655,686, and in U. S. P. 2,553,956. Moreover, even with these prolonged cooling and crystallization periods of the prior art, the gamma material secured often is contaminated with comparatively large amounts of other isomers and impurities, thus reducing the insecticidal potency and marketability of the product and requiring additional complicated processing for freeing the gamma isomer product from such contaminants.

For instance, British Patent 655,686 points out that "rapid cooling while stirring" results in production of a material containing only 75% gamma isomer and 25% alpha isomer. This patent cautions that it is necessary to cool the concentrated benzene extracts solution of benzene hexachloride very slowly, say 36 hours, and without agitation to obtain a reasonably satisfactory gamma isomer product. However, even the latter product may contain as much as 3% of other isomers and impurities according to this British specification.

Further, the gamma isomer crystals obtained by practice of the prior art processes involving prolonged periods of quiet cooling and crystallization, are generally in the form of a compact layer or mass at the bottom of the crystallizing vessel, which crystal mass is usually difficult to handle in succeeding processing operations.

Finally, the crystallization processes of the prior art often result in low yields of gamma isomer based on the gamma content of the crude benzene hexachloride.

One object of this invention is the isolation of the gamma isomer of benzene hexachloride from crude benzene hexachloride.

Another object is the provision of procedure for rapidly and easily crystallizing the gamma isomer of benzene hexachloride from concentrated gamma-enriched solutions of crude benzene hexachloride substantially without precipitation of other isomers.

Another object is to provide a process for rapidly and easily crystallizing the gamma isomer of benzene hexachloride from solutions of crude benzene hexachloride saturated with alpha, beta and gamma isomers, substantially without precipitation of the alpha and beta isomers.

Another aim of the invention is the provision of a process for rapidly and easily crystallizing the gamma isomer of benzene hexachloride in desirable crystal form from methanol solutions of crude benzene hexachloride saturated with alpha, beta and gamma isomers, substantially without crystallizing out the alpha and beta isomers.

Yet another object is to provide, by means of the invention procedure, a mixture of gamma isomer crystals of benzene hexachloride and solvent liquor, in a condition readily adapted to further processing, including recrystallization, to secure a highly purified gamma isomer product.

A still further aim of the invention is the provision of procedure for obtaining practically pure odorless gamma isomer of benzene hexachloride possessing high insecticidal potency in good yield, rapidly and under commercially feasible operating conditions using standard equipment.

Other objects and advantages will be apparent from the following description of the invention.

In accordance with the invention and contrary to the teachings of the prior art, it has now unexpectedly been found that a material consisting essentially of the gamma isomer of benzene hexachloride may be readily obtained by cooling a hot concentrated extract solution of crude benzene hexachloride in a selective solvent of the group consisting of the lower aliphatic alcohols containing from 1 to 3 carbon atoms and carbon tetrachloride, from an elevated temperature at which said solution is unsaturated with respect to gamma isomer, preferably the boiling point of said solution, over a period not exceeding 4 hours with agitation to below the temperature at which said solution is saturated with the alpha, beta and gamma isomers, the rate of agitation being sufficient to permit crystallizing out a substantial portion of the gamma isomer content of said solution essentially without crystallization of the alpha and beta isomers. Agitation is preferably also sufficiently rapid to maintain at least a large portion of the crystals formed in motion throughout the body of liquor. The material thus crystallized may contain as high as 99% or more gamma isomer and is in a physical condition which renders it readily separable from the main body of liquor in the crystal-liquor mixture, e. g. by decantation, and readily manageable in subsequent operations for producing a final gamma isomer product of high purity.

Best results are realized in accordance with the invention when cooling and crystallization are carried out in a confined zone substantially completely closed from the surrounding atmosphere. By practice of the invention process, especially in conjunction with a further hereinafter-described feature, which involves recovering from the above separated main body of liquor a material containing a substantial proportion of the gamma content of such liquor and recycling such material for additional extraction with selective solvent along with fresh crude benzene hexachloride to further enrich the extract solution with gamma, high yields of gamma isomer may be obtained in addition to increased capacity. A practically pure, odor-free gamma isomer product in a yield as high as 75% or more based on the gamma isomer content of the crude benzene hexachloride starting material may be secured in accordance with the invention on recrystallization of the gamma isomer, particularly in the manner described below.

In practice of the invention, a material rich in gamma isomer obtained from a subsequent stage of the invention process may first be added to the crude benzene hexachloride. Such material may be added to the crude benzene hexachloride prior to extraction thereof with solvent, or both the crude benzene hexachloride and the gamma-rich material may be separately charged to the extractor and mixed therein during extraction. The crude benzene hexachloride is generally in the form of a solid mixture, which, as previously noted, contains alpha, beta, gamma and delta isomers, predominating in alpha. This crude material may contain 12–15% gamma isomer and 60–70% alpha, a representative material being composed of about 14% gamma, 65% alpha, 8% beta and 12% delta, along with about 1% of chlorinated benzene by-products. The gamma-rich material added to and extracted with the crude benzene hexachloride may contain 30 to 50% gamma, the remainder being principally alpha isomer.

This gamma-rich material, as previously noted, is secured from a later stage of the instant process, more fully described below, and is referred to herein as "rework" material. Such "rework" may be incorporated in varying quantities with the crude benzene hexachloride, and usually in an amount of about 25 to 60% by weight of the latter material. The resulting mixture may contain say 18 to 25% gamma isomer as compared to the 12 to 15% gamma in the crude benzene hexachloride.

The mixture of crude benzene hexachloride and "rework" material is subjected to extraction with solvent for dissolving gamma isomer selectively from the mixture.

While any of the solvents defined above, including methanol, ethanol, n-propanol, isopropanol and carbon tetrachloride, may be employed, it is preferred to utilize methanol, and the invention will hereinafter be described particularly in connection with the use of methanol as solvent although it is understood that the invention is not to be considered as limited in this respect. The solvent is added in amount sufficient to dissolve practically all of the gamma isomer but only a portion of the alpha and beta isomers in the gamma-enriched crude benzene hexachloride mixture. While the amount of solvent used may vary, the quantity ordinarily applied is about 1 to 4, preferably 2 to 3, times by weight of the mixture to be extracted. Preferably, countercurrent extraction is employed.

The extraction operation may be carried out at so-called ordinary temperatures of say about 15 to 25° C. However, lower or higher temperatures of extraction may be employed commensurate with favorable gamma selectivity thereat so as to obtain a gamma-enriched extract. Thus, with respect to use of methanol as solvent, our experience has shown that temperatures as high as 50° C. or more may be satisfactorily utilized to secure a gamma-rich solution from which the gamma isomer may be recovered as product in accordance with the invention principles.

The extract solution so produced contains a mixture of alpha, beta, gamma and delta isomers, which mixture is richer in gamma than the mixture extracted. The table below indicates the approximate solubility of each of the alpha, beta, gamma and delta isomers of benzene hexachloride, separately at 20° C. in each of the solvents employed in the invention.

TABLE

| Solvent | Solubility in Grams per 100 Grams Solution | | | |
|---|---|---|---|---|
| | Alpha | Beta | Gamma | Delta |
| Methanol | 2.1 | 1.6 | 6.8 | 27.3 |
| Ethanol | 1.8 | 1.1 | 6.4 | 24.2 |
| n-Propanol | 1.6 | 1.1 | 5.2 | 21.1 |
| Isopropanol | 0.6 | 0.4 | 2.8 | 18.0 |
| Carbon Tetrachloride | 1.8 | 0.3 | 6.7 | 3.6 |

After extraction, the effluent solution may be filtered to remove any solids present therein. The resulting extract solution of the invention may contain from about 12 to about 23% total dissolved solids (12 to 23% solution). Where, in accordance with preferred procedure, "rework" rich in gamma isomer is incorporated with the crude benzene hexachloride to enrich it with gamma, 40 to 50%, more usually 45 to 50%, of the dissolved solids in the resulting extract solution is composed of gamma isomer. This proportion of gamma is substantially larger than the approximately 35% gamma in the dissolved solids of the extract solutions of the prior art, e. g. British Patent 573,693, not involving recovery in the process of a material rich in gamma and addition of same to crude benzene hexachloride starting material. Accordingly, as will be apparent hereinafter, the invention process possesses the important added advantage over the prior art of production of higher yields of gamma isomer product.

The extraction residue may be practically dry or may be in the form of a pasty mass holding considerable solvent. Such residue contains practically no gamma isomer and is composed principally of alpha and beta isomers, mostly alpha. The solvent in the residue may be recovered, and the final residue obtained constitutes a by-product of the process.

The extract solution is then heated to evaporate a quantity of solvent such that the resulting solution, when cooled, becomes saturated with respect to the alpha, beta and gamma isomers therein. Prior to evaporation, however, where subsequent recrystallization of gamma isomer is carried out for purification purposes, liquor remaining from such recrystallization and containing solvent and dissolved gamma, may be conveniently added to the extract solution to further enrich same with gamma in a manner more fully described below. When employing methanol as solvent, the evaporation is preferably carried out so as to result in a concentrated solution containing say about 25 to 32% solids (25 to 32% solution). On the other hand, however, with other solvents, the evaporation of solvent may be carried forward so as to produce concentrated solutions of lower or higher solids content, e. g. with carbon tetrachloride a concentrated extract solution containing up to 50% or more solids may be obtained. However, the concentrated extract solutions, regardless of the particular invention solvent employed, are not saturated with respect to any of the isomers contained therein at the boiling points of these solutions.

When the evaporation of solvent has proceeded to the desired point, the hot concentrated extract solution is then subjected to cooling and crystallization for precipitating gamma isomer. This is the most critical stage of the instant process and must be carried out properly to obtain the desired results. During cooling, the solution becomes saturated with respect to the alpha, beta and gamma isomers, but under the operating conditions set forth herein, a substantial portion of the gamma content of the solution is rapidly crystallized out without causing crystallization of the alpha and beta isomers from the solution. The delta isomer also remains in solution during the entire cooling period. The concentrated extract solutions of the invention are generally cooled to a point which is below the temperature at which the solution becomes saturated with alpha, beta and gamma isomers, but which is above 50° F.

The two most important factors of the cooling and crystallization operation of the invention are rapidity of (1) cooling and crystallization and (2) agitation of the solution during this period. In accordance with the principles of the invention utilizing the above noted solvents, the entire period necessary for cooling and crystallization is not more than 4 and usually only ½ to 3 hours, a period exceedingly less than the approximately 12 to 48 hours of the prior art for this purpose. Particularly when methanol is employed as solvent, it is preferred to cool the concentrated extract solution relatively slowly at first from its boiling point to an intermediate temperature with rapid agitation to prevent crystals of alpha isomer from forming on the walls of the vessel and in the solution. During this first portion of the cooling period, although the solution becomes saturated with the less soluble alpha and beta isomers, no crystals of these isomers are formed in the solution. At the end of this initial cooling period, the solution is saturated with respect to gamma isomer, and shortly thereafter, gamma isomer crystals commence to precipitate from solution. It is noted that the solution may become super-saturated with respect to gamma and also the alpha and beta isomers before crystals of gamma appear, and that the solution may continue to remain supersaturated with alpha and beta throughout the period of crystallization of gamma isomer.

When the point of gamma saturation has been reached and some crystals of gamma have formed, cooling may thereafter take place as rapidly as possible with the rate of agitation decreased but sufficient to keep preferably at least a major portion or all of the crystals in motion throughout the body of liquor in the crystallizer. During this second portion of the cooling period, such agitation and rapid cooling tend to prevent precipitation of alpha and beta, particularly the former, from the solution, which remains saturated with both of these isomers throughout this portion of the cooling and crystallization period. However, the latter stage of the cooling period is not carried out so rapidly as to allow local supercooling which may initiate crystallization of alpha or of any other impurities. We have found that best results are obtained if the second cooling stage is carried out down to a temperature of about 86° F. when using methanol as solvent and to about 77° F. when using carbon tetrachloride. Cooling to lower temperatures with these particular solvents tends to crystallize out some alpha along with the gamma.

In order to prevent air currents from sweeping across the solution which might aid in the formation of alpha and beta crystals on the surface of the solution, cooling and crystallization are preferably carried out in a confined zone substantially completely closed from the surrounding atmosphere. It is also of importance to prevent particles of foreign matter, e. g. dust containing alpha and beta, from dropping out of the atmosphere into the solution and forming nuclei from which alpha and beta crystals might form. Hence, the use of a closed cooling and crystallizing vessel is preferred, and in general operation of the process, the vessel employed for evaporating solvent may also conveniently be utilized as a crystallizer.

When the hot concentrated extract solution has been cooled down in the initial cooling stage to a point where it becomes saturated with gamma, seed crystals or nuclei of gamma isomer may be introduced to help initiate crystallization of this isomer from solution. In these circumstances, care must be exercised to use pure gamma seed crystals. Alternatively, nucleation may be carried out by adding to the extract solution when cooled to gamma saturation, a slurry of seed crystals in a solvent preferably that used for extraction of the crude benzene hexachloride. The seed crystals employed are preferably of a size passing a U. S. number 30 screen. While the amount of seed crystals utilized may vary, we have found good results are obtainable using on the order of 0.2% of such crystals by weight of the gamma crystal crop produced in this operation.

According to the invention then, the gamma seed crystals are introduced into the concentrated extract solution at a temperature and under conditions where such crystals will not dissolve in the solution, and this seeding thus encourages rapid crystallization of gamma isomer from the solution. However, seeding or nucleation of the saturated extract solution is not actually necessary, since gamma crystals will in any event begin to form shortly after the solution becomes saturated with respect to gamma.

Prolonged cooling and agitation of the extract solution, thermal shock or the presence of alpha or beta nuclei tend to give a mixture of alpha and beta crystals along with gamma, which of course is undesirable. During the crystallization period, contamination of the gamma crystals due to precipitation of alpha crystals is readily detected by a change in batch appearance. The initial change takes the form of a disappearance in the sparkle of the solution, followed by gradual loss of translucency. At this point, the batch rapidly becomes opaque and must either be recrystallized or reworked in the extraction column.

On completion of the crystallization period, agitation is stopped, the gamma crystals in the crystal-liquor mixture are settled and the supernatant mother liquor is readily separated from the crystals, e. g. by decantation, and processed for recovery of gamma-containing "rework" which is recycled in the process. The wet gamma isomer crystal material secured by the cooling and crystallization operation of the invention is in the form of a loose mass of sugar-like crystals, which mass is not only easily separable from the main body of liquor but may also be readily handled and redissolved in subsequent recrystallization operations for removal of impurities as hereinafter described.

In a preferred embodiment of the invention employing methanol as solvent, the extract solution contains 45 to 50% gamma isomer in the dissolved solids and this solution is concentrated by evaporation of methanol to about 30% total solids. The concentrated solution is then cooled, conveniently in the same vessel, from about 149° F., the boiling point of the solution, to about 110° F. over a period of about 15 minutes to ½ hour with rapid agitation. At 110° F., seed crystals of gamma may be added to the solution, if desired. Cooling is then continued at a more rapid rate to 90–80° F., the rate of agitation being decreased during this period but sufficient to maintain a large number of crystals in suspension throughout the body of liquor. This latter cooling period may be of some 10 to 20 minutes duration. Temperature is thereafter maintained at 80–90° F. for say 15 or 20 minutes with agitation, after which time agitation is stopped and the gamma crystals are allowed to settle. Accordingly, cooling and crystallization may be completed in a total time as little as about one hour. The mother liquor is then decanted and the resultant wet gamma isomer crystal cake is ready for purification in the manner set out below.

Exclusive of occluded liquor, the initial gamma isomer crystal mass obtained by practice of the invention is composed of almost pure (99% or more) gamma, but contains a small portion, generally less than 1%, of odor-forming impurities considered to be chlorinated benzene by-products present in the crude benzene hexachloride. While this crystalline material may be dried and used as an insecticide, an odor-free material is preferred in commerce. Hence, in order to remove impurities and obtain a substantially odor-free gamma isomer product best adapted for commercial marketing as an insecticide, the crude product is generally subjected to one or more recrystallizations from a solvent, preferably that employed in the above-described extraction operation. In preferred practice, the crude gamma isomer product containing the above odor-forming constituents is subjected to two recrystallizations. In the first of these recrystallization operations, the crystals of gamma isomer are dissolved in the solvent-gamma isomer liquor effluent from the hereinafter described second recrystallization, and the resulting solution cooled to recrystallize gamma isomer. The liquor resulting from this step and still containing some gamma isomer along with odor-forming constituents in solution, is then recirculated and combined with the solvent-crude benzene hexachloride extract solution prior to concentration thereof as described in detail above.

The partially purified recrystallized gamma isomer product which still contains some odor-forming constituents is subjected to a second recrystallization from solvent to remove the bulk of the remaining odor-forming constituents and obtain a pure substantially odor-free gamma isomer product. The resulting solvent solution containing some gamma isomer and odor-forming constituents is then recirculated to the first recrystallization step to dissolve the crude gamma isomer crystals obtained in the primary crystallization from the concentrated extract solution.

The final odor-free gamma isomer product obtained from the recrystallization operations meets all the specifications of "lindane" (benzene hexachloride, gamma isomer) required for commercial marketing. Yields of final product as high as 75% based on the gamma content of the crude benzene hexachloride starting material are realized as compared to the low yields of the prior art, e. g. the approximately 25% yield obtainable by the operations of British Patent 573,693.

The mother liquor separated from the crop of gamma isomer crystals produced in the primary crystallization operation from the concentrated extract solution is then processed to recover a substantial portion of its gamma content, the recovery material or "rework" rich in gamma being combined with the crude benzene hexachloride starting material to augment its gamma content and likewise enrich the resulting extract solution with gamma. This liquor contains all of the isomers present in crude benzene hexachloride, predominating in alpha, and it is particularly desirable to remove as much of the delta content of the liquor as possible along with alpha and beta isomers, in order that the "rework" material obtained from the remaining constituents in the liquor and recycled by incorporation with fresh benzene hexachloride starting material, does not cause a detrimental build-up in the system of isomers other than gamma, particularly delta. Accordingly, the mother liquor from the primary crystallization is reworked by evaporation and/or cooling to obtain one or more crops of crystals which may contain some 30 to 50% gamma, the remainder being essentially alpha.

For example, in preferred practice of the invention, employing methanol as solvent, the liquor obtained from the primary crystallization may be concentrated to a 55 to 75% solution, cooled and agitated to precipitate a "rework" crystal crop which may consist of say 65 to 89% of the solids content of such liquor. Alternatively, the liquor from the primary crystallization operation may be processed to crystallize out one crop and the remaining liquor concentrated and cooled to secure an additional crop of crystals, both crops being then combined and recycled, or the individual crops separately recycled.

Following the "rework" operations, the final mother liquor may be evaporated to remove solvent, leaving a residue containing a high proportion of delta isomer along with some gamma, other isomers and impurities. This residue may be employed as a raw material for the manufacture of trichlorobenzene or may be utilized as an insecticidal material.

The following are examples of preferred operation of the process, all quantities therein being expressed in parts by weight. The operations of Example 1 are described particularly in connection with the attached flow sheet.

*Example 1.*—About 9,200 parts of crude benzene hexachloride containing 14.5% gamma isomer and 4,800 parts of "rework" material analyzing about 40% gamma were charged to extractor 1 and extracted therein with about 39,420 parts of methanol obtained from methanol storage tank 10, to form 46,380 parts of extract solution containing about 15% benzene hexachloride solids. Residue from the above extraction operation amounted to 6,700 parts and contained about 85 parts of gamma isomer. Methanol in this residue was removed, the final residue having utility as raw material for the manufacture of trichlorobenzene.

The extract solution, 46,380 parts, was combined with about 7,020 parts of methanol-gamma containing liquor effluent from a later stage of the process, and the combined solution containing about 14.4% benzene hexachloride solids, of which 48% was gamma isomer, was evaporated to a 30% solution in evaporator 2 by taking off 27,760 parts of methanol. The 30% solution was cooled in primary crystallizer 3, from its boiling point of about 149° F. with agitation to 110° F. in about 20 minutes at a rate of about 1.8° F. per minute. Agitation was provided by a pitched blade turbine type impeller which was driven at about 300 R. P. M. during this first portion of the cooling period. At 110° F. seed crystals of gamma isomer were introduced and cooling was continued for about 15 minutes until 86° F. was reached, the agitator being driven at about 100 R. P. M. during this period. The temperature was held at 86° F. for 20 minutes, with agitation continued at 100 R. P. M. during this time so as to just keep the crystals in suspension. At the end of this time the batch had a clear sparkling appearance with sharply defined gamma crystals. Agitation was then stopped and the crystals allowed to settle for 5 minutes. The supernatant mother liquor, 23,140 parts (25.6% solids), was decanted as quickly as possible and saved for preparing "rework" to go back into the extraction operation. The crystal crop remaing consisted of about 2,500 parts of crude gamma crystals and contained about 99% gamma isomer.

To the crystal crop thus obtained was added about 5,930 parts of methanol-gamma containing liquor from a subsequent stage of the process, and the mixture heated in vessel 4 (first recrystallizer) to a boil to dissolve all the solids. The gamma isomer in the solution was then recrystallized by cooling with agitation to 86° F. and holding at this temperature for one hour. The gamma crystals thus formed, 1,400 parts, were separated from the mother liquor by centrifuging, 7,020 parts of methanol-gamma containing liquor being obtained which was combined with extract solution as described above. If desired, instead of employing a separate vessel 4 as the first recrystallizer, the above 5,930 parts of methanol-gamma containing liquor may simply be added to the crystal mass in the bottom of primary crystallizer 3, and the initial recrystallization carried out therein as just described to obtain partially purified gamma crystals.

The 1,400 parts of partially purified gamma crystals were mixed with 5,550 parts methanol from storage tank 10, and the mixture put in solution form by heating in vessel 5 (second recrystallizer). Purified gamma isomer was recrystallized from this solution by cooling to 50° F. with agitation for one hour. The purified gamma isomer crystals were separated from 5,930 parts mother liquor by centrifuging. This methanol-gamma containing liquor was recycled and used for the first recrystallization of the crude gamma crystals as described above. The gamma crystal crop from the second recrystallization was dried in dryer 6, and 1,000 parts of practically pure odor-free gamma isomer (99.9+% gamma containing only traces of impurities) having a melting point of about 112.5° C. were obtained, representing a yield of about 75% based on the gamma content of the crude benzene hexachloride starting material.

The decanted mother liquor from the primary crystallizer 3 was concentrated in evaporator 7 to a 65% solution by evolving 14,940 parts of methanol. The 65% solution was then cooled with agitation to 32° F. in crystallizer 8 and held for 2 hours to cause maximum crystallization. Upon centrifuging the resulting mixture 4,800 parts of wet "rework" cake composed of about 40% gamma and 60% alpha were obtained, along with about 3,400 parts of methanol mother liquor containing portions of all of the isomers and impurities, and rich in delta. The "rework" cake was fed back into the extraction operation along with fresh crude benzene hexachloride.

The 3,400 parts of mother liquor obtained from the "rework" operation were fed to evaporator 9, wherein about 1,940 parts of methanol were evolved. 1,470 parts molten residue were obtained containing 16.9% gamma isomer. This residue, high in delta isomer, may be used as a raw material for the manufacture of trichlorobenzene or may be employed as an insecticidal material.

*Example 2.*—Substantially the same extraction procedure was carried out as in Example 1, using carbon tetrachloride as solvent instead of methanol. Here, however, the crude benzene hexachloride-extract solution containing about 48.3% gamma in the dissolved solids, was concentrated to about 50% before carrying out the primary crystallization operation. The hot 50% extract solution was then cooled from its boiling point at about 189° F. to 86° F. at a rate of about 1.8° F. per minute with agitation. At 86° F. seed crystals of the gamma isomer of benzene hexachloride were added to the solution, and cooling was continued to about 77° F. with agitation, at which point crystallization commenced. Cooling was then stopped and the batch was agitated for 30 minutes at 77° F., following which the crystals of crude gamma isomer were settled, separated from mother liquor and subjected to recrystallization essentially as described in Example 1 to obtain a pure odor-free gamma isomer product in a yield of about 50% based on the gamma isomer content of the crude benzene hexachloride starting material.

The mother liquor from the primary gamma crystallization was cooled to about 46° F., seeded with gamma isomer and agitated vigorously for 4 hours. The crystal crop obtained was centrifuged, and a wet cake secured containing 46% gamma isomer. This "rework" crop was recycled to the extraction operation. The remaining mother liquor was concentrated to a 50% solution, cooled to 46° F., seeded with gamma and agitated to bring down a crystal mass. The resulting crop of crystals was centrifuged, and the wet cake obtained, containing about 47% gamma isomer, was also recycled to the extraction operation.

From the foregoing, it is seen that by means of the invention process, particularly the primary crystallization feature thereof, a pure odor-free gamma isomer product of marked insecticidal value may be secured from crude benzene hexachloride at rapid crystallization rates, high capacity and with outstanding yields heretofore generally unattainable by conventional prior art procedures.

Since various changes and modifications may be made in the invention without departing from the spirit thereof, the invention is to be taken as limited only by the scope of the appended claims.

We claim:

1. A process for the treatment of crude benzene hexachloride to obtain a material consisting essentially of the gamma isomer which comprises extracting a gamma-enriched crude benzene hexachloride with a selective solvent of the group consisting of the lower aliphatic alcohols containing from 1 to 3 carbon atoms and carbon tetrachloride, in an amount sufficient to dissolve practically all of the gamma isomer but only a portion of the alpha and beta isomers, whereby there is formed an extract solution containing proportions of alpha and gamma isomers of the same order of magnitude, evaporating a quantity of solvent from the extract solution such that the resulting concentrated solution, when cooled, becomes saturated with respect to the alpha, beta and gamma isomers, cooling said hot concentrated solution in a confined zone completely closed from the surrounding atmosphere, from the boiling point of said solution rapidly over a period of from ½ to 3 hours with agitation to below a temperature at which said solution is saturated with the alpha, beta and gamma isomers, but not below about 77° F., the rate of agitation being sufficient to permit crystallizing out a substantial portion of the gamma content of said solution without causing crystallization of the alpha and beta isomers, and to maintain a large number of the crystals formed in suspension throughout the body of liquor, promptly separating the crystals of gamma isomer substantially free from other benzene hexachloride isomers from the liquor in the resulting mixture, subjecting the crystals so obtained to a first recrystallization by dissolving said crystals in the solvent-gamma isomer liquor from the hereinafter recited second recrystallization and cooling the resulting solution to recrystallize gamma isomer, subjecting partially purified gamma isomer crystals so obtained to a second recrystallization from a selective solvent to obtain pure odor-free gamma isomer product, the resulting solvent-gamma isomer liquor being recirculated to said first recrystallization and the solvent-gamma isomer liquor from said first recrystallization being combined with said solvent-gamma enriched crude benzene hexachloride extract solution prior to concentration thereof.

2. A process for the treatment of crude benzene hexachloride to obtain as product the pure odor-free gamma isomer thereof, said crude material containing 12–15% gamma isomer and the alpha, beta and delta isomers, predominantly alpha, which comprises adding a material consisting essentially of gamma and alpha isomers to said crude material, extracting the gamma-enriched crude benzene hexachloride with methanol in an amount sufficient to dissolve practically all of the gamma isomer but only a portion of the alpha and beta isomers, said extract solution containing about 48% gamma in the dissolved solids, evaporating a quantity of solvent from the extract solution such that the resulting concentrated solution contains about 30% solids and, when cooled to below about 110° F., becomes saturated with respect to the alpha, beta and gamma isomers, cooling said hot concentrated solution with agitation in a confined zone substantially completely closed from the surrounding atmosphere, from the boiling point of said solution at about 149° F. rapidly over a period of about one hour to about 86° F., the rate of agitation being sufficient to maintain a large number of the crystals formed in suspension throughout the body of liquor the rate of cooling between 110° F. and 86° F. being more rapid than between 149° F. and 110° F., to thereby crystallize out a substantial portion of the gamma content of said solution without causing crystallization of the alpha and beta isomers therefrom, stopping the agitation and allowing the crystals of gamma isomer to settle, separating said crystals from the crystal-liquor mixture by decantation of the liquor, concentrating said liquor to about a 55 to 75% solution by evaporation of methanol, cooling the resulting solution to form crystals of a material consisting essentially of the gamma and alpha isomers and containing about 40% gamma, leaving practically all delta isomer in solution, adding said material to additional crude benzene hexachloride to enrich same with gamma, subjecting the crystals of gamma isomer separated from said crystal-liquor mixture to a first recrystallization by dissolving said crystals in the methanol-gamma isomer liquor from the hereinafter recited second recrystallization and cooling the resulting solution to recrystallize gamma isomer, subjecting the so-obtained partially purified gamma isomer crystals to a second recrystallization from methanol to obtain pure odor-free gamma isomer as a product, recirculating the resulting methanol-gamma isomer liquor to said first recrystallization and combining the methanol-gamma isomer liquor from said first recrystallization with said methanol-gamma enriched crude benzene hexachloride extract solution prior to concentration thereof.

3. A process as defined in claim 2 wherein seed crystals of gamma isomer are introduced into said extract solution when it reaches 110° F. during cooling, said seed crystals being of a size passing a U. S. Number 30 screen.

References Cited in the file of this patent

UNITED STATES PATENTS 2,553,956    Burrage et al. _____ May 22, 1951